Inventor
Thomas Barish
Vaino A. Hoover

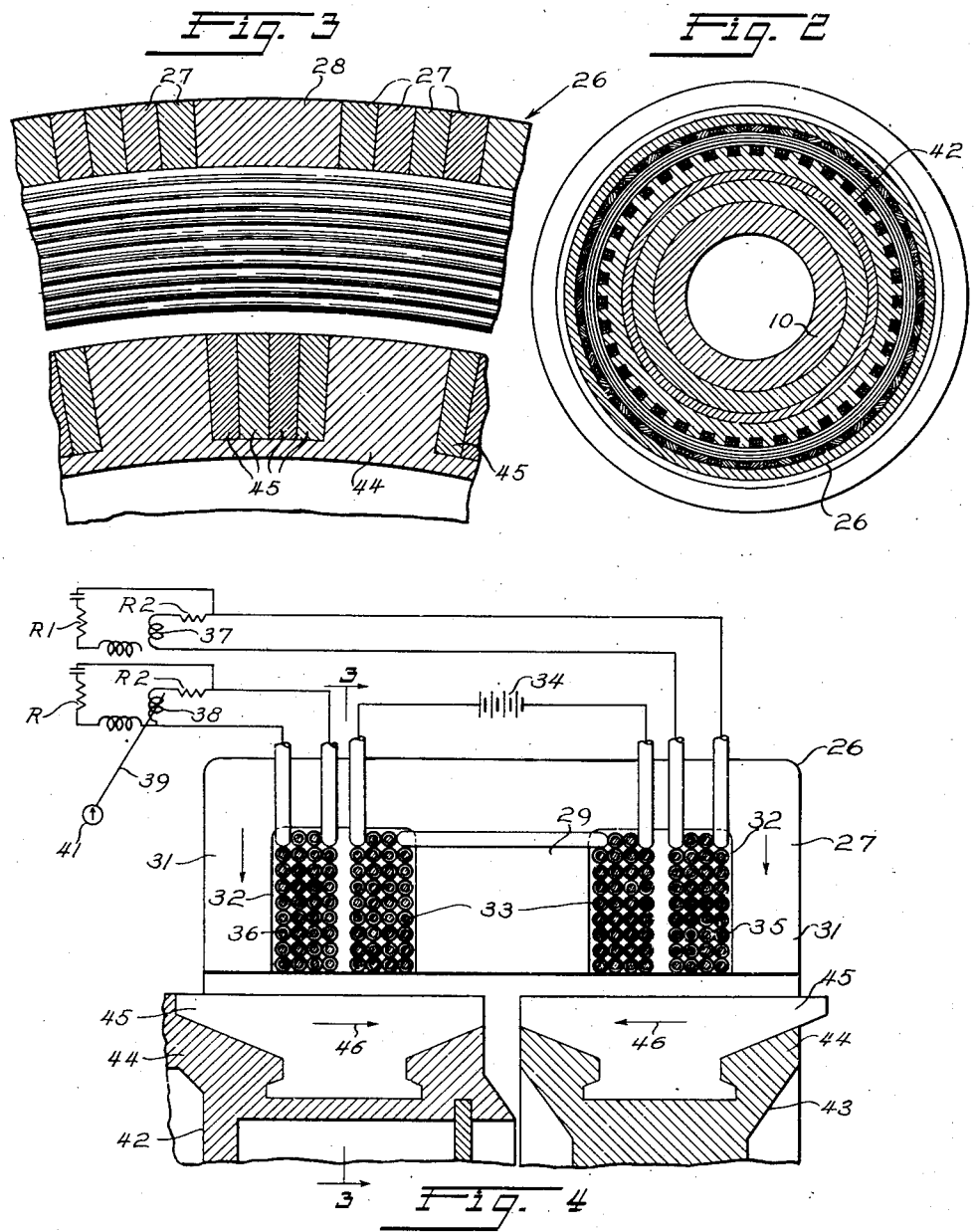

Inventor
Thomas Barish
Vaino A. Hoover

Patented Feb. 27, 1945

2,370,167

UNITED STATES PATENT OFFICE 2,370,167

INDICATOR FOR VARIABLE PITCH PROPELLERS

Vaino A. Hoover, Los Angeles, Calif., and Thomas Barish, University Park, Md., assignors to Engineering and Research Corporation, Riverdale, Md., a corporation of Maryland Application January 16, 1942, Serial No. 427,052

11 Claims. (Cl. 170—163)

This invention relates generally to variable pitch propellers and, more particularly, to an electrically operated indicating mechanism for indicating the propeller pitch.

One of the objects of the invention is to provide indicating means for variable pitch propellers or the like, in which an indicator is operated by variations between two electric currents produced by relative rotation of parts which are rotatable relatively in accordance with variations in the propeller pitch.

Another object of the invention is to provide indicating means for variable pitch propellers or the like, in which parts relatively rotatable in accordance with variations in the propeller pitch induce electric currents, the difference of which may be utilized to operate an indicator. Preferably, the induced currents are alternating currents whose frequency is varied in accordance with the rotation of the parts, and the indicator is a synchronous motor, movable in accordance with the difference in the frequencies.

Another object of the invention is to provide indicating means for variable pitch propellers or the like, in which the rotation of two relatively rotatable parts in a stationary magnetic field induces currents which are combined to produce an indicating movement proportional to the difference between the two currents.

Still another object of the invention is to provide indicating means for a variable pitch propeller which is operated electrically, and in which no slip rings, commutators, or other moving contacts are required.

The above and other objects and advantages of the invention will be more readily apparent from the following description of the embodiment shown in the accompanying drawings, in which:

Figure 2 is a section on the line 2—2 of Figure 1;

Figure 3 is an enlarged partial section on the line 3—3 of Figure 1;

Figure 4 is an enlarged partial section similar to Figure 1, including a wiring diagram;

Figure 1:
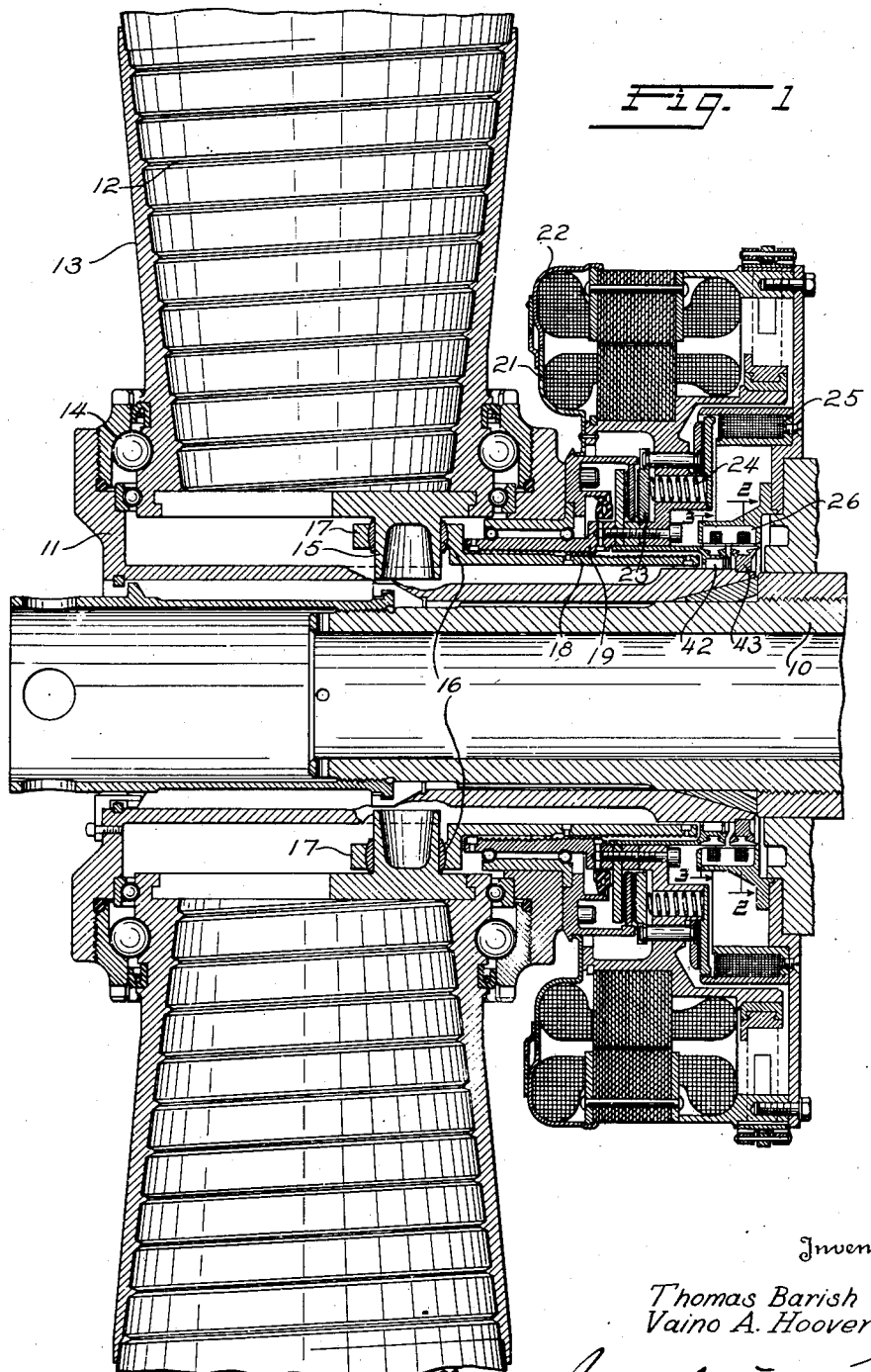
Figure 1 is a section of a propeller having indicating means embodying the invention.

The propeller illustrated comprises a propeller shaft 10, which may be the crank shaft of an engine or a suitable extension thereof, and on which a hub 11 is rigidly mounted. Blades 12 are mounted in radially extending sockets 13, which are rotatably mounted in the hub on ball bearings 14, which permit the blades and sockets to turn in the hub to vary the pitch of the blades. The blades and sockets are adapted to be turned by means of pins 15 secured to the inner ends of the sockets, and eccentric to the axes thereof, and having ball members 16 slidably mounted thereon. The ball members are surrounded by sockets 17, formed on the projections on one end of a sleeve 18, which is splined to the propeller shaft to rotate therewith. The sleeve 18 is exteriorly threaded or grooved to cooperate with an interiorly threaded or grooved sleeve 19, which is rotatably mounted around the sleeve 18. Relative rotation of the two sleeves 18 and 19 will cause axial movement of the sleeve 18, the sleeve 19 being fixed against axial movement, and will, through the socket 17, the ball members 16, and the pins 15, turn the blades in the hub.

In order to cause relative movement between the sleeves 18 and 19, the outer sleeve 19 is connected to the rotor 21 of an electrical machine, including, in addition to the rotor, a fixed stator 22. The electrical machine 21—22 may be controlled externally in any desired manner to cause the rotor 21 and the connected sleeve 19 to rotate at a speed either greater than or less than that of the propeller shaft 10, so as to produce a change in the pitch of the blades in the desired direction.

Normally, the sleeves 18 and 19 rotate together at the same speed, and in order to insure that there will be no unintentional relative movement between them, a brake, indicated generally at 23, is provided, connecting the sleeves 18 and 19 together for simultaneous rotation. The brake is normally held engaged by a spring 24, and is adapted to be disengaged by a solenoid 25 when the solenoid is energized.

In operation, with the brake engaged and the sleeves 18 and 19 turning together, the blades will be held in the position to which they have been adjusted. When it is desired to change the pitch of the blades, an electric circuit under the control of the pilot or an automatic governor is energized, first to operate the solenoid 25 to release the clutch 23, and then to turn the rotor 21 and sleeve 19 at a desired speed, either greater or less than the speed of the propeller shaft. The propeller, as so far described, is of the type more particularly described and claimed in the co-pending application of Henry A. Berliner, Serial No. 412,322, filed September 25, 1941.

The pitch indicating means of the present invention is particularly adapted for use with a propeller of this type, and as illustrated, includes a fixed ring 26 made up, as best seen in Figures 2, 3 and 4, of alternating segments 27 and 28 of magnetic and non-magnetic material respectively. The segments 27, as seen in Figure 4, are generally of E-shape, having a central leg 29 and end legs 31, providing between them a pair of circumferential grooves 32. Within the grooves 32 and adjacent the central leg 29 are provided circumferentially extending windings 33, connected in series, and energized by direct current from a source such as the battery indicated at 34. Outside of the windings 33 and in the grooves 32 are provided a second pair of windings 35 and 36, connected respectively to the field and armature windings 37 and 38 of a synchronous electric motor. The armature 39 of the motor is connected to an indicator 41, which may conveniently be calibrated to read directly in terms of propeller pitch. The motor 37—38 is preferably of the two-phase slip ring synchronous type. As will be seen, the stator and rotor are excited from separate voltage and frequency sources 35, 36. The rotor phase rotation is the same as that of the stator and the tendency of the rotor is therefore to stand still when the frequencies delivered by 35 and 36 are equal. Resistances R1 and R2 are in circuit with each of the rotor and stator windings and eliminate any circulating current in either winding due to relative rotation thereof.

Adjacent to the ring 26 and within the circumference thereof there are arranged two relatively rotatable rings 42 and 43, which may be substantially identical in construction. The ring 42 is connected to the sleeve 19 to rotate therewith, and the ring 43 is connected directly to the propeller shaft 10. Each of the rings is formed with a body portion 44 of non-magnetic material, having set therein a plurality of spaced sets of laminations 45 of magnetic material.

In operation of this mechanism, the coils 33 create a stationary magnetic field in the direction of the arrows 46 in Figure 4. As the rings 42 and 43 rotate through this field, they alternately complete and interrupt the magnetic circuit to induce in the coils 35 and 36 alternating currents of frequencies proportional respectively to the speed of rotation of the rings. These two alternating currents are impressed on the field and armature windings 37 and 38 of the synchronous motor, and when the two currents are of the same frequency, there will be no relative rotation between the field and armature. When, however, the rings 42 and 43 rotate relatively during adjustment of the propeller pitch, as described above, the two induced currents will be of different frequencies and will cause a corresponding rotation of the armature shaft 39, thereby adjusting the indicator 41 to indicate the change in the propeller pitch. Since the rotor and stator phase rotation of the motor are the same its rotation will be proportional to the frequency difference of the induced currents to give an accurate indication of the pitch change and when the induced currents have the same frequency the motor will tend to stand still. It will be apparent that functions of the induced currents other than frequency might be employed to operate the indicator, but I prefer to utilize the frequency, since it makes possible synchronous operation of the indicating mechanism and provides a higher degree of accuracy.

Figure 5:
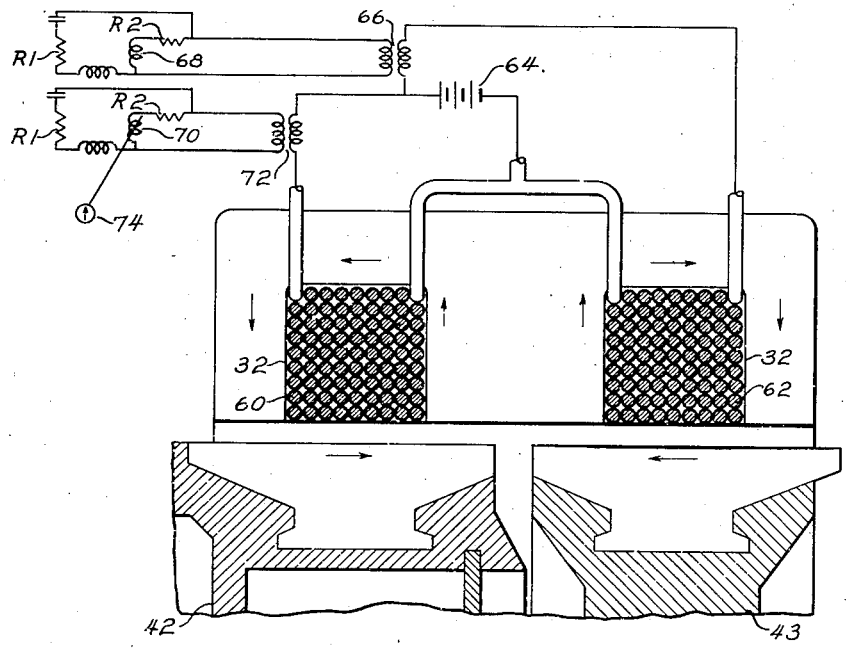
Figure 5 is a view similar to Fig. 4 showing a preferred form of the invention.
Figure 6:
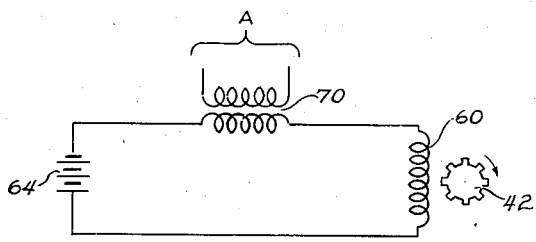
Figure 6 is a circuit diagram of parts shown in Figure 5.
Figure 7:
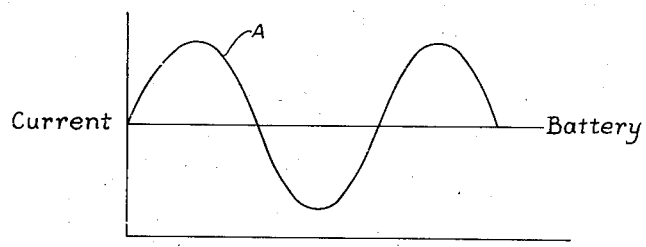
Figure 7 shows certain current relationships in the circuit of Figure 6.

A preferred embodiment of the invention is disclosed in Fig. 5 and is explained further in Figs. 6 and 7. In this embodiment a single coil is placed in each of the grooves 32, these being indicated at 60 and 62 in Fig. 5. The opposite terminals of both coils are connected to the opposite terminals of a battery 64, the coils therefore being in parallel. The circuit of coil 62 includes the primary of a transformer 66, the secondary of which is connected to the stator windings 68 of a two-phase, slip-ring type synchronous motor, the rotor winding 70 of which is connected through transformer 72 to the circuit of coil 60. Resistances R1 and R2 are connected to each of the stator and rotor windings to eliminate circulating currents therein due to relative rotation between the stator and rotor. An indicator 74 is connected to be operated by the rotor 70.

In the operation of the apparatus of Fig. 5, energization of coils 60 and 62 causes a magnetic field to be set up about each coil, as shown by the arrows in Fig. 5. Rotation of the rotor rings 42, 43 in these fields causes an alternating current to be induced in each coil in addition to the direct current therein due to battery 64, which alternating currents are supplied, respectively, to the rotor and stator windings 70, 68, in the manner and with the results described hereinbefore. The described current relationships may be better understood by reference to Figs. 6 and 7. In Fig. 6 the battery is shown connected to one of the coils, such as 60, the transformer 72 being shown in the circuit. The rotor 42 is represented in Fig. 5 by the gear wheel 42. Battery 64 will supply a direct current to coil 60, causing a magnetic field to be set up, within which the gear wheel rotates. The variable inductive effect of the gear wheel rhythmically varies the magnetic field about the coil 60, thereby producing an alternating current in the primary of transformer 70. The battery current and the current in transformer 70 are shown in Fig. 7.

While the invention has been illustrated and described in connection with an indicating mechanism for a variable pitch propeller, it will be understood that this mechanism might be utilized for other indicating purposes, and that various changes in the specific mechanism might be made. It is, therefore, not my intention to limit the scope of the invention to the exact form or purpose described, or otherwise than by the limitations of the appended claims.

What is claimed is:

1. In a variable pitch propeller mechanism of the type comprising a drive shaft, a part connected to the shaft for rotation therewith, a part normally rotating with the shaft but capable of rotation at a speed different from that of the shaft, means responsive to differential rotation of said two parts for adjusting the pitch of a blade carried by the shaft, and means for causing differential rotation of said parts, means for indicating the pitch of the blade comprising means surrounding the shaft for setting up a magnetic field, means carried by the shaft and rotatable therewith in the magnetic field for producing an alternating current of a frequency proportional to the speed of rotation of the shaft, means carried by said second-named part and rotatable therewith in the magnetic field for producing an alternating current of a frequency proportional to the speed of rotation of said second named part, and means for producing an indication of the amount of any variation between the frequencies of the two alternating currents.

2. A pitch indicating mechanism according to claim 1, in which the means for producing an alternating current proportional to the speed of rotation of the shaft comprises a ring formed of alternate sections of conducting material and non-conducting material concentric with the shaft.

3. A pitch indicating mechanism according to claim 1, in which the means for producing an alternating current proportional to the speed of rotation of the second named part of the pitch changing mechanism comprises a ring formed of alternate sections of conducting and non-conducting material which is concentric with the shaft.

4. In indicating means for propeller pitch or the like, generating apparatus comprising a ring formed of alternate sections of magnetic and non-magnetic material, coils carried by the ring to produce a magnetic field therein, a pair of rings rotatable relative to the first ring and to each other, said pair of rings including alternate sections of magnetic and non-magnetic material, and a pair of coils lying in the magnetic field and positioned to have induced therein currents of frequencies proportional respectively to the rates of rotation of said pair of rings relative to the first ring.

5. In indicating means for propeller pitch or the like, generating apparatus comprising a ring formed of alternate sections of magnetic and non-magnetic material, coils carried by said ring, means to energize said coils to produce a stationary magnetic field about each of said coils, and a ring rotatable in the magnetic field of each coil, each of said rings comprising alternate segmental sections of magnetic and non-magnetic material whereby there is produced in each coil an alternating current having a frequency proportional to the speed of rotation of the associated ring.

6. Indicating means according to claim 5, in which the terminals of each coil are connected to a source of direct current.

7. Indicating means according to claim 5, in which each coil is in circuit with a source of direct current and each such circuit includes the primary of a transformer, the secondary of which is adapted to be connected to one of the windings of a motor.

8. In a variable pitch propeller mechanism of the type comprising a drive shaft, a part connected to the shaft for rotation therewith, a part normally rotating with the shaft but capable of rotation at a speed different from that of the shaft, means responsive to differential rotation of said two parts for adjusting the pitch of a blade carried by the shaft, and means for causing differential rotation of said parts, means for indicating the pitch of the blade comprising a ring fixedly mounted around the shaft formed of alternate sections of magnetic and non-magnetic material, coils carried by the ring to produce a magnetic field therein, a pair of rings rotatable in the magnetic field formed of alternate sections of magnetic and non-magnetic material, said pair of rings being connected to said parts respectively for rotation therewith, a pair of coils lying in the magnetic field and positioned to have induced therein frequencies proportional respectively to the rates of rotation of said pair of rings relative to the first ring, and indicating means responsive to the difference in the frequencies of the two induced currents.

9. The construction defined in claim 8 in which the indicating means comprises an induction motor having relatively movable parts connected respectively to said pair of coils.

10. In a variable pitch propeller mechanism of the type comprising a drive shaft, a part connected to the shaft for rotation therewith, a part normally rotating with the shaft but capable of rotation at a speed different from that of the shaft, means responsive to differential rotation of said two parts for adjusting the pitch of a blade carried by the shaft, and means for causing differential rotation of said parts, means for indicating the pitch of the blade comprising a ring fixedly mounted around the shaft formed of alternate sections of magnetic and non-magnetic material, a pair of coils carried by the ring to produce a magnetic field about each of the coils, a ring rotatable in the magnetic field of each of the coils formed of alternate sections of magnetic and non-magnetic material, said rings being connected to said parts respectively for rotation therewith, means to energize the coils to produce said magnetic fields, and indicating means connected to the coils and responsive to the difference in frequency induced therein by rotation of the rings.

11. In a variable pitch propeller mechanism of the type comprising a drive shaft, a part connected to the shaft for rotation therewith, a part normally rotating with the shaft but capable of rotation at a speed different from that of the shaft, means responsive to differential rotation of said two parts for adjusting the pitch of a blade carried by the shaft, and means for causing differential rotation of said parts, means for indicating the pitch of the blade comprising a ring fixedly mounted around the shaft formed of alternate sections of magnetic and non-magnetic material, a pair of coils carried by the ring to produce a magnetic field about each of the coils, a ring rotatable in the magnetic field of each of the coils formed of alternate sections of magnetic and non-magnetic material, said rings being connected to said parts respectively for rotation therewith, means to connect each of the coils in circuit with a source of direct current, a transformer primary in circuit with each coil, transformer secondaries associated with the primaries, and a motor having a pair of windings connected to said secondaries respectively.

VAINO A. HOOVER.
THOMAS BARISH.